United States Patent [19]

Lefrancois et al.

[11] Patent Number: 4,793,936

[45] Date of Patent: Dec. 27, 1988

[54] METHOD OF RECOVERING ALKALI METAL FLUORIDES FROM ORGANIC SLURRY

[75] Inventors: Philip A. Lefrancois, Cranford; Donald Pickens, Mendham, both of N.J.

[73] Assignee: Allied-Signal Inc., Morris Township, Morris County, N.J.

[21] Appl. No.: 518,882

[22] Filed: Aug. 1, 1983

[51] Int. Cl.$^4$ .................................................. C02F 1/52
[52] U.S. Cl. .................................. 210/729; 210/737; 210/774; 210/908; 210/915
[58] Field of Search ............... 210/915, 908, 702, 729, 210/737, 728, 749, 774, 775, 799; 568/635, 699; 423/180, 185, 302 R, 302 T, 300, 490

[56] References Cited

U.S. PATENT DOCUMENTS

| | | | |
|---|---|---|---|
| 3,268,071 | 8/1966 | Puddington et al. | 209/5 |
| 3,953,332 | 4/1976 | Speth | 210/737 |
| 4,198,297 | 4/1980 | Voldes-Hrieg | 210/704 |
| 4,374,111 | 2/1983 | Lefrancois | 423/347 |
| 4,407,783 | 10/1983 | Ulmer et al. | 423/347 |

FOREIGN PATENT DOCUMENTS 2540292  3/1977  Fed. Rep. of Germany .
012566  12/1974  Japan .................................. 423/490
0123499  10/1978  Japan .................................. 568/699

OTHER PUBLICATIONS

Condensed Chemical Dictionary, 10th Ed., 1981, p. 630.
Chemical Engineers Handbook, Perry & Chilton, Fifth Edition.

Primary Examiner—Benoit Castel
Attorney, Agent, or Firm—Richard C. Stewart, II; Gerhard H. Fuchs

[57] ABSTRACT

A method for recovering organic ether solvent and alkali metal fluoride from a slurry thereof such as may be formed as a byproduct in silane manufacture. First water is added to a slurry having an organic ether liquid phase and a finely-divided solid phase comprising an alkali metal fluoride. The water is added in an amount sufficiently large to reduce adherence of organic ether to the solid phase and sufficiently small not to create a discernable separate aqueous liquid phase. The slurry with added water is maintained at a treatment temperature of at least about 50° C. for a treatment period of at least one minute, typically 15–30 minutes at 90°–110° C. Thereafter, the treated slurry is seaparated into a crude fluoride solid and an ether liquid suitable for direct recycle or recycle after simple further treatment.

22 Claims, No Drawings

METHOD OF RECOVERING ALKALI METAL FLUORIDES FROM ORGANIC SLURRY

BACKGROUND OF THE INVENTION

The present invention relates to the recovery of alkali metal fluorides such as NaF from slurries in organic ether solvents such as diphenyl ether.

Alkali metal fluoride salts exhibit low solubilities in water and extremely low solubilities in most organic media. Nevertheless, when such fluorides form a finely-divided solid phase in slurries of organic ether solvents, simple methods of separation (centrifugation or filtration) become difficult. There are generally two desired goals of such recovery: first, to recover as much of the solvent with a minimum of degradation in a form suitable for recycle, and, second, to recover the fluoride salt in a form that can be worked up to contain a minimum of organic contaminants.

In particular, in the process of U.S. Pat. No. 4,374,111 to Lefrancois (1983), a silicon halide such as silicon tetrafluoride is reacted with an alkali metal hydride such as sodium hydride in a diaryl ether solvent such as diphenyl ether (especially in admixture with biphenyl). The product, silane, is a gas which is easily removed (except for small amounts which remain dissolved in the solvent). The byproduct is a slurry of finely-divided fluoride in ether solvent, e.g. finely divided sodium fluoride in diphenyl ether/biphenyl. Usually some unreacted hydride and/or some alkali metal fluosilicate will also be present in the alkali metal fluoride phase. Such slurries have proved difficult to filter or centrifuge (as described below), with large amounts of solvent adhering to the particles in a sludge that usually prevents good phase separation or rapid and high-yield filtrate recovery. Both dissolved silane and unreacted sodium hydride present potential hazards in dealing with this sludge because of their reactivities with air and/or water.

BRIEF DESCRIPTION OF THE INVENTION

The present invention includes a method for recovering organic ether solvent and alkali metal fluoride from a slurry which comprises the steps:

(a) adding water to a slurry having an organic ether liquid phase and a finely divided solid phase comprising an alkali metal fluoride, said water being added in an amount sufficiently large to reduce adherence of organic ether to the solid phase and sufficiently small not to create a discernable separate aqueous liquid phase;

(b) maintaining the slurry with added water at a treatment temperature at least about 50° C. for a treatment period of at least one minute, and (c) separating the slurry with added water after treatment into a crude fluoride solid and an ether liquid.

The invention is particularly applicable to slurries of finely-divided NaF in diphenyl ether wherein the added water is preferably about 50 to about 150 weight % by weight of solids in the slurry, the treatment temperature is preferably about 80° to about 120° C. and the separation after treatment is preferably by filtration or centrifugation. Addition of surfactant to the water will lower the necessary time of treatment at temperature.

DETAILED DESCRIPTION OF THE INVENTION

The present method is applicable to a variety of slurries comprised of organic ether phase and finely-divided solid phase comprising alkaline metal fluorides. The ether phase will contain a substantial proportion, in general a major proportion (over 50% by volume) of an ether, and especially an aromatic ether such as diphenyl ether. The ether phase may also contain a minor proportion of various hydrocarbons, and especially biphenyl (which forms a eutectic with diphenyl ether sold under the trademark Dowtherm A). Other hydrocarbons which may be present include especially aliphatic hydrocarbons with atmospheric boiling points of at least 200° C., and especially in ranges which start at temperatures such as 250° C. or 300° C. Other minor components which may be present in the organic ether phase include benzene, alkali metal phenates, oligomerized aromatics, and other byproducts or breakdown products of the major components.

The slurry treated also contains a finely-divided solid phase containing an alkali metal fluoride. The solid phase is generally of particles no more than about 50 micrometers in diameter, and especially with particles under about 10 micrometers in diameter. Of course, the particles need not be of uniform particle size, with variations between the smallest and largest particles of a hundred fold or more being common. The solid phase should contain as major component an alkali metal fluoride, especially sodium fluoride but also, in some case, lithium fluoride or potassium fluoride. Impurities which may be present in the solid phase include the corresponding hydroxides, hydrides, fluosilicates and silicates. Silica may also be present as a minor component in the solid phase.

A source of such slurry is the process of U.S. Pat. No. 4,374,111, identified above. There, in preferred forms, diphenyl ether (especially in admixture with biphenyl) is used as solvent for the reaction of sodium hydride (generally introduced in mineral oil) and gaseous silicon tetrafluoride. The byproduct slurry of the reaction (after silane is removed as a gaseous product) will then be sodium fluoride with some unreacted sodium hydride and/or some over-reacted sodium fluosilicate in the solid phase. Trace amounts of water at various places in the system will also cause sodium hydroxide, silica and/or sodium silicate to be present as well. The liquid phase will contain diphenyl ether and biphenyl and hydrocarbons (primarily alphatic from the mineral oil) as well as small amounts of degradation byproducts such as sodium phenate. Solids content of the slurry will generally be between 5 and 15 weight percent, with sodium hydride being present in an amount generally under 10 molar percent of total sodium hydride and sodium fluoride; with sodium hydride levels under 5% being preferred and under 2% being more preferred. Some silane may be present dissolved in the liquid phase.

In the method of the present invention, water is added to such slurries in an amount from about 50 to about 150%, by weight of solids. The exact amount of water which is optimally added will vary depending upon several factors: If increased levels of sodium hydride and/or silane are present in the slurry, they will consume water (forming hydrogen) and therefore as these increase, more water should be used. In general, the amounts of about 50 to about 150%, by weight of solids, apply to that water added in addition to that necessary to react with sodium hydride and silane. As the particle size of the solid phase decreases, more water may be required or desirable in that smaller particles have a larger total surface area, and therefore require more water to displace the ether from the particle surface.

The water can be added to hot, warm or even cold slurry. Preferably, since the slurry is generally produced hot (in the process of U.S. Pat. No. 4,374,111, the reaction temperature is most preferably about 250°–260° C.), it is preferred to cool the hot slurry to the treatment temperature (e.g., to 80°–120° C.) or slightly hotter, and then add water.

The treatment of the present method is conducted at an elevated temperature (at least about 50° C., preferably about 80°–120° C. and more preferably about 90°–110° C.). Preferred and more preferred upper limits of the temperature are chosen to minimize water evaporation during the treatment; however, higher temperatures can be used if the equipment of the treating vessel can withstand pressure. As the temperature is increased above 50° C., then above 80° C. and finally above 90° C., the treatment process is generally improved in the sense that more filterable products are produced, or the same quality of products are produced in a shorter treatment. The treatment is preferably conducted with agitation.

In some forms of the invention, a surfactant is present during treatment, preferably added with the water. While any type of surfactant (anionic, cationic or nonionic) may be used, it is generally preferred to use surfactants that will stay predominately with the aqueous phase rather than the organic phase. In particular, anionic surfactants are expected to apportion particularly toward the solids (aqueous) phase and thus are expected to be found at the lowest level in the organic phase which, in most cases, is intended to be recycled to a process. Since surfactants may increase the foaming during a process (such as the process of U.S. Pat. No. 4,374,111) it is preferred to use conditions that will either minimize the amount of surfactant apportioning to the liquid phase or to include a treatment step of the liquid phase that removes such surfactants before reuse. The relative usefulness of various surfactants, and optimum levels for each surfactant relative to the amount of water added, can be determined by routine experimentation such as described in Example 22 below.

Suitable treatment periods will vary widely depending upon slurry concentration, amounts of water added, treatment temperatures, whether or not surfactants are used (and if so, how much and what type), degrees of agitation and other method parameters. Generally, some beneficial effect will be achieved with at least one minute of treatment, and normally continuing treatment after about 150 minutes will be non-productive. Preferred times (after a desirable temperature and water level have been selected) will generally be between about 5 and about 30 minutes, with the lower end of that range (5–10 minutes) generally preferred when proper amounts of surfactants have been used, and the upper end (15–30 minutes) generally applied when no surfactant is present. The treatment can be in a batch or continuous fashion; and in the case of continuous treatment, the relevant time will be the residence time of the slurry at the treatment temperature before separation. While treatment for periods in excess of the optimal period is generally not harmful, in some instances (especially with surfactants) greatly excessive periods may lead to agglomeration of the solid phase into excessively large particles (which are curd-like), which may trap liquid and thus organic phase with the solids.

Once the treatment step has been completed, the treated slurry can be separated into a solid and liquid phase by conventional techniques. Two especially preferred forms of separation are filtration and centrifugation, with ordinary equipment of various types being suitable: vacuum, Buchner or glass type, cake filters, pressure and vacuum filters, centrifuges and similar devices. The separation step can be conducted at the treatment temperature, or upon slurry that is cooling or heating from the treatment temperature to some other temperature. Furthermore, especially if the treated liquid is permitted to cool towards room temperature, the treated slurry may stand for extended periods between treatment and separation. The liquid formed by the separation (i.e., the filtrate) may contain small amounts of suspended solids and still be suitable for most uses (e.g., for recycling to the process of U.S. Pat. No. 4,374,111). This liquid phase may contain some water, such as one hundred to four hundred ppm's water in some of the examples described below. While such liquid phase is still suitable for many applications, in some forms of the invention it is preferred to dry the liquid phase prior to reuse. Such drying may be accomplished by azeotropic stripping (e.g., with toluene), by passage through molecular sieves, or by other suitable drying agents such as calcium sulfate, calcium chloride, silica gel or alumina.

The solids produced by the separation step are generally a crude alkali metal fluoride which may require further treatment before use or disposal. Among the treatments that may be used are washing with a volatile organic solvent such as hexane, acetone, benzene, toluene or heptane, heating to drive off the organics at temperatures between about 100° to about 500° C. (preferably in stages from moderate temperatures to extremely high temperatures), recrystallization in water or volatile organic solvents, solubilization in hydrogen fluoride solution followed by crystallization of sodium bifluoride and decomposition thereof to NaF and HF. The alkali metal fluoride after these treatments may be of a suitable quality to be used as such (as in water treatment) or may be used as a reactant for its fluoride values. In some cases, especially with sodium fluoride, the solids may be used to treat gas streams containing either hydrogen fluoride and/or silicon tetrafluoride to absorb them and form sodium bifluoride and/or sodium fluosilicate.

The present invention is illustrated by the following examples, which are intended to illustrate rather than limit the scope of the present invention.

EXAMPLE 1

Slurries from four continuous laboratory runs of the process of U.S. Pat. No. 4,374,111 were combined and used for the following tests. These slurries contained, as liquid phase, approximately 70% diphenyl ether, 25% biphenyl, hydrocarbons (mineral oil with lowest boiling point 200° C.) and traces of dissolved silane and breakdown products. The solids phase [approximately 10% of the slurry] was over 80% NaF, with some NaH and $Na_2SiF_6$.

In each of the following runs, 1.5–2 liters of slurry were placed in a magnetically-stirred beaker, to which water was slowly added in most runs. The slurry was heated in many runs. Thereafter, the treated slurry was centrifuged or vacuum filtered in a Buchner funnel.

In Runs A–D, the above procedure was followed for 30–60 minutes with the slurry at room temperature, and water added at levels of 5%, 10%, 20% and 50%, by volume of slurry. Some foaming (due to hydrogen formation from NaH) occurred. The slurry, previously unsuitable for centrifugation, could be centrifuged but only with considerable time periods to compact the solid.

indicated for 60, 30 or 15 minutes. After partial cooling, each treated slurry was vacuum filtered in a Buchner funnel using #41 Whatman paper. Times were recorded until a first crack in the cake was observed and until a pressed case was formed (after first crack). The results are shown in Table 1.

TABLE 1

| Example | Water (vol %) | Treatment Temp. (°C.) | Treatment Time (min) | Filtration Crack (min) | Filtration Press (min) | Organic Recovery (%) | Organic Recovery (ppm water) |
|---|---|---|---|---|---|---|---|
| Comparative | 0 | 97–105 | 60 | >132 | — | — | — |
| 3 | 10 | 100–105 | 60 | 3 | 2 | — | 750 |
| 4 | 10 | 80–84 | 60 | 54 | 14 | 94 | 800 |
| 5 | 5 | 97–118 | 60 | 4.8 | 9 | 95 | 400 |
| 6 | 7.5 | 104 | 30 | 4.5 | 12 | 99 | NM |
| 7 | 7.5 | 105 | 15 | 6.3 | 7 | 94 | 810 |
| 8 | 7.5 | 106 | 30* | 2.3 | 6 | 97 | 510 |
| 9 | 6 | 106 | 30* | 4.0 | 10 | 98.7 | 350 |
| 10 | 8 | 105 | 30* | 2.4 | 10 | 99.9 | 790 |
| 11 | 10 | 105 | 30* | 2.3 | 10 | 99.9 | 710** |

*In Examples 8–11, the magnetic stirring bar was replaced by a direct-driven PTFE impeller operated at 400 rev/min.
**In Example 11, some separate aqueous liquid was also present.
NM = not measured In Runs E–H, Runs A–D were repeated with the slurries at 100° C. for 30–60 minutes. All four slurries could now be filtered, but runs G (20%) and H (50%) produced discernible aqueous liquid phases after treatment and after filtration.

In runs I and J, treatment was conducted with 5 and 10 volume percent water, respectively, at 95°–105° C. for 30 minutes. After treatment, both materials were vacuum filtered, with Run J taking only 51 minutes (approximately half that required for run I). Run K was a repeat of Run J (10 volume % water) except that the treatment period was reduced to 20 minutes (the temperature also varied more widely between 90° C. and 110° C.). Now 8 hours were required to filter.

The filtrate from Run J was analyzed by Karl Fischer Reagent and contained 450 ppm water. A portion of this filtrate was redistilled at 10 mm Hg pressure (1.33 kPa) to produce a liquid (112°–124° C. at this pressure) with 33 ppm water. Both performed well on recycle to the process of U.S. Pat. No. 4,374,111. Commercial DOWTHERM A contains approximately 200 ppm water, and the published saturation level of water at 30° C. is 800 ppm. The liquid (after separating the aqueous phase) in Runs G and H had 715 ppm water (lower than 800 ppm because, perhaps, of the presence of dissolved NaF in the aqueous phase).

EXAMPLE 2

Run J of Example 1 was repeated (using 10 volume % water) for 15, 30 and 60 minutes at 85°–110° C. The 60-minute sample filtered immediately through #41 Whatman paper, and the solids were pressed down and the filtration completed within 8 minutes. The other samples (30 and 15 minute treatment times) took 29 and 40 minutes to produce equivalent quality filter cakes.

EXAMPLES 3–8

A slurry from a larger scale practice of the continuous process of U.S. Pat. No. 4,374,111 containing 9.5% solids was used in the following experiments. NaH was present in an amount of 0.35% (by total weight of slurry). Samples of this slurry (200 mL) were placed in a flask equipped with magnetic stirring bar and water-cooled condenser and held (after addition of 5%, 7.5% or 10% water, by volume of slurry) at the temperature

EXAMPLE 12

Using the same slurry as in Examples 3–8 (9.5% solids), a one liter sample was treated with 7.5% water at 104° C. for 30 minutes, cooled, bottled and subsequently filtered rapidly on a continuous vacuum filtration device. However, a six liter batch, treated for 30 minutes at 103° C. in a twelve liter flask with a four inch (9 cm) long half-moon shaped PTFE impeller operating at 400 rev/min, filtered poorly in a similar test. Repeating the laboratory filtering of an aliquot took 24 minutes (to "crack" as in Table 1). By reheating an aliquot to 106°–107° C. for 90 minutes, a sample was produced which filtered ("crack") in 4.25 minutes. Reheating another aliquot for 60 minutes lowered the filtering time to 12 minutes. Allowing an aliquot to stay at temperature for 127 minutes produced agglomeration into a sticky mass.

EXAMPLES 13 AND 14

The general procedures of Examples 8–10 were performed on a slurry containing 0.98% NaH, treated at 100°–110° C. under reflux while stirring 200 ml samples at 400 rev/min. The 8% water-treated slurry was treated for 60 minutes and, after cooling, filtered in 11.5 minutes. The 10% slurry agglomerated after 31 minutes at temperature. At this point filtration was normal (except that solids adhered to the treatment flask wall). In each case 175–176 mL filtrate was recovered. Calcination of the solid, in each case, at gradually increasing temperatures produced volatiles which (by temperature and odor) appeared to be water, then diphenyl ether/biphenyl, then mineral oil.

EXAMPLES 15–21

A different slurry from larger scale operation of the process of U.S. Pat. No. 4,374,111 (containing 0.80% NaH) was treated as in Examples 3–11. The results are shown in Table 2.

TABLE 2

| Ex | Percent Water | Treatment Time (min) At 100–110° C. Reflux | Filtration Min To Crack | Filtrate (mL) |
|---|---|---|---|---|
| Comp | 0 | 180 | — | 47 |

TABLE 2-continued

| Ex | Percent Water | Treatment Time (min) At 100-110° C. Reflux | Filtration Min To Crack | Filtrate (mL) |
|---|---|---|---|---|
| 15 | 8 | 60 | 34 | 167 |
| 16 | 10 | 15 | 8 | 171 |
| 17 | 10 | 30 | 3 | 174 |
| 18 | 10 | 34* | — | 177 |
| 19 | 12 | 42* | 5 | 176 |
| 20 | 12 | 51* | 9 | 176 |
| 21 | 25 | 210 | 67 | 187 |

*Agglomerated

It appears that 10% water was optimum for this slurry treated at 100°-110° C. The differences between Examples 3-12 and Examples 13-21 are attributable in part to the lower NaH content of the former (0.35% NaH versus 0.90% NaH or 0.80% NaH).

EXAMPLE 22

Example 18 was repeated using 10% of water with 0.4% TRITON ® X-100 surfactant (an alkyl phenoxy polyethoxy ethanol from Rohm and Haas) basis total slurry. The 34 minute agglomeration time was reduced to 10-15 minutes. The use of lower levels of surfactant (0.004% surfactant basis total slurry) was similarly effective.

What is claimed:

1. A method for recovering organic ether solvent and alkali metal fluoride from a slurry which comprises the steps:
   (a) adding water to a slurry consisting of an organic ether liquid phase and a finely-divided solid phase comprising an alkali metal fluoride, said water being added in an amount sufficiently large to reduce adherence of organic ether to the solid phase and sufficiently small not to create a discernable separate aqueous liquid phase;
   (b) maintaining the slurry with added water at a treatment temperature of at least about 50° C. for a treatment period of at least one minute, and
   (c) separating the slurry with added water after treatment into a crude fluoride solid and an ether liquid.

2. The method of claim 1 wherein the organic ether liquid phase comprises diphenyl ether.

3. The method of claim 2 wherein the organic ether liquid phase further comprises biphenyl.

4. The method of claim 3 wherein the organic ether liquid phase further comprises aliphatic hydrocarbons with an atmospheric boiling point above 200° C.

5. The method of claim 2 wherein the organic ether liquid phase further comprises aliphatic hydrocarbons with an atmospheric boiling point above 200° C.

6. The method of claim 2 wherein the alkali metal fluoride is NaF.

7. The method of claim 6 wherein the finely-divided solid phase further comprises NaH.

8. The method of claim 7 wherein sufficient water is added to react said NaH and provide between about 50 and about 150 weight % water, by weight of solids in the slurry, for displacement of organic ether from the solid phase.

9. The method of claim 7 wherein the treatment temperature is between about 80° C. and about 120° C.

10. The method of claim 9 wherein the treatment period is between about 5 and about 150 minutes.

11. The method of claim 10 wherein the treatment temperature is between about 90° C. and about 110° C.

12. The method of claim 6 wherein the finely-divided solid phase further comprises $Na_2SiF_6$.

13. The method of claim 6 wherein between about 50 and about 150 weight % water is added, by weight of solids in the slurry.

14. The method of claim 2 wherein the treatment temperature is between about 80° C. and about 120° C.

15. The method of claim 1 wherein the alkali metal fluoride is NaF.

16. The method of claim 15 wherein the finely divided solid phase further comprises NaF.

17. The method of claim 15 wherein the finely divided solid phase further comprises $Na_2SiF_6$.

18. The method of claim 15 wherein the treatment temperature is between about 80° C. and about 120° C.

19. The method of claim 1 wherein the treatment temperature is between about 80° C. and about 120° C.

20. The method of claim 1 wherein said separation step (c) comprises filtration.

21. The method of claim 1 wherein said separation step (c) comprises centrifugation.

22. The method of claim 1 wherein the added water contains a surfactant.

* * * * *